US008258663B2

(12) United States Patent
Smoot et al.

(10) Patent No.: US 8,258,663 B2
(45) Date of Patent: Sep. 4, 2012

(54) MAGNETIC LEVITATION NOVELTY DEVICE

(75) Inventors: Lanny S. Smoot, Thousand Oaks, CA (US); Gary W. Schnuckle, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 541 days.

(21) Appl. No.: 12/567,896

(22) Filed: Sep. 28, 2009

(65) Prior Publication Data

US 2011/0074237 A1    Mar. 31, 2011

(51) Int. Cl.
*H02N 15/00* (2006.01)
(52) U.S. Cl. .................. 310/90.5; 361/143; 361/144
(58) Field of Classification Search .............. 310/90.5; 361/143, 144
See application file for complete search history.

(56) References Cited

U.S. PATENT DOCUMENTS

| | | | | | |
|---|---|---|---|---|---|
| 2,323,837 | A * | 7/1943 | Neal | .............................. | 434/134 |
| 2,566,221 | A * | 8/1951 | Lovell | ........................... | 310/166 |
| 2,946,930 | A * | 7/1960 | Gilbert | .......................... | 361/144 |
| 4,585,282 | A * | 4/1986 | Bosley | ......................... | 310/90.5 |
| 5,003,235 | A * | 3/1991 | Groom | .......................... | 318/135 |
| 5,168,183 | A * | 12/1992 | Whitehead | ................. | 310/12.09 |
| 5,267,091 | A * | 11/1993 | Chen | ............................. | 359/872 |
| 5,404,062 | A * | 4/1995 | Hones et al. | ................. | 310/90.5 |
| 5,467,244 | A * | 11/1995 | Jayawant et al. | ............. | 361/144 |
| 5,883,454 | A * | 3/1999 | Hones et al. | ................. | 310/90.5 |
| 6,154,353 | A * | 11/2000 | Bowers et al. | ................ | 361/144 |
| 6,275,127 | B1 * | 8/2001 | French | .......................... | 335/285 |
| 6,373,676 | B1 * | 4/2002 | Baker et al. | ................... | 361/143 |
| 6,608,540 | B1 * | 8/2003 | Hones et al. | ................. | 310/90.5 |
| 7,110,236 | B2 * | 9/2006 | Joachim | ........................ | 361/139 |
| 7,348,691 | B2 * | 3/2008 | Davis et al. | ................ | 310/12.19 |
| 7,671,712 | B2 * | 3/2010 | Elliott et al. | ................. | 335/306 |
| 7,898,133 | B2 * | 3/2011 | Lieberman | .................. | 310/90.5 |
| 8,154,164 | B2 * | 4/2012 | Lieberman | .................. | 310/90.5 |
| 8,169,114 | B2 * | 5/2012 | Simon | ......................... | 310/90.5 |
| 2004/0052029 | A1 * | 3/2004 | Joachim | ........................ | 361/143 |
| 2009/0160279 | A1 * | 6/2009 | Baur | .......................... | 310/90.5 |
| 2009/0184595 | A1 * | 7/2009 | Farber | ......................... | 310/90.5 |
| 2009/0309440 | A1 * | 12/2009 | Lieberman | .................. | 310/90.5 |
| 2011/0074237 | A1 * | 3/2011 | Smoot et al. | ................. | 310/90.5 |
| 2011/0163611 | A1 * | 7/2011 | Lieberman | ................... | 307/104 |

* cited by examiner

*Primary Examiner* — Quyen Leung
*Assistant Examiner* — David Scheuermann
(74) *Attorney, Agent, or Firm* — Marsh Fischmann & Breyfogle, LLP; Kent A. Lembke

(57) ABSTRACT

An apparatus for animating a magnetically levitated object. The apparatus includes a display with an overhead housing. A magnetic levitation and oscillation assembly is included with an electromagnet in the overhead housing. A levitated object with a body in which a magnetic element is embedded is positioned proximate to the electromagnet and levitated within the display. The levitation and oscillation assembly includes a levitation actuator driving the electromagnet with a control signal to generate a levitating magnetic field. The assembly includes an oscillating signal generator that oscillates the levitating magnetic field at an oscillating frequency. During magnetic field oscillation, the object body is levitated by the electromagnet and is concurrently subjected to first oscillating movements while attached elements such as wings are subjected to second oscillating movements near their resonant frequency with larger displacements, whereby the object body appears stationary while attached elements vibrate with a reciprocating or flapping motion.

20 Claims, 5 Drawing Sheets

MAGNETIC LEVITATION NOVELTY DEVICE

BACKGROUND

1. Field of the Description

The present invention relates, in general, to methods and devices for moving wings on a toy or other object to simulate natural flight, and, more particularly, to a toy or novelty device that uses magnetic levitation techniques to cause an object or figure such as a winged character to hover on a display platform such that the body is relatively stationary while its wings move to imitate a hovering hummingbird or the like.

2. Relevant Background

Children have always had a fascination with flight and flying object, and winged dolls and other winged toys have always been popular. Flying toys are even more interesting to children when the wings move. For example, winged dolls or fairies that appear to fly by fluttering their wings are very attractive toys. Often, the toy does not actually fly but is instead moved by a playing child with the moving wings adding to the flight effect.

It has proven relatively difficult to create a toy design that is effective in making the wings move in a manner that creates an illusion of natural flight such as a bird that flaps its wings in a life-like manner. One ongoing problem is how to create a desirable fluttering motion in which the wings move independently of the figurine or toy body. In nature, a flying bird such as a hummingbird moves its wings rapidly to fly while the body appears to remain stationary. In contrast, many flying toys are designed to couple the wing to the body such that when the wings are flapped the entire toy including the body appears to be shaking or vibrating, which is not a natural flight effect. Another design issue is how to suspend the figurine or toy body such that the figurine or toy body seems to be supported solely by the wing movement. In some cases, flying toys are tethered from below or above by a string or wire that causes the toy to fly in a circular pattern and that is visible, which can destroy a free-flying effect.

Other design issues have limited production and sales of toys that simulate flight. Moving wings at high speed can require a significant amount of power that may require a sizeable motor and power source. For example, toys may include the motor and power source within the toy body to flap the wings, which results in a relatively heavy and large toy body. Moreover, the fluttering motion itself is difficult to implement with available toy motors. Cost effective and efficient toy motors produce rotational motion but then require additional mechanisms to translate the rotational motion produced by the motor into a fluttering motion that may be useful for driving wing movement.

Hence, there remains a need for toy and novelty designs that are effective in simulating natural flight with a realistic wing fluttering or movement and that are useful in causing the toy to hover with its body relatively still or stationary relative to rapidly moving wings. Preferably such toy designs would be relatively simple to manufacture, would be lightweight, and would use inexpensive components.

SUMMARY OF THE INVENTION

The following description provides a novelty display device or toy that selectively oscillates or modulates a levitating force used to float or levitate a displayed object to animate the object. For example, the object may be a bird or fairy and it is made to hover with flapping or fluttering wings but a relatively still or stationary body. Such a hovering effect may be achieved by providing a magnetic levitation device with a display stand or structure that includes an overhead housing in which an electromagnet is placed. The electromagnet may be driven in part by a relatively stable drive loop including a reference signal or voltage and a feedback signal from a position sensor (e.g., a Hall effect sensor) indicating a separation distance between the electromagnet and a magnetic element embedded in the body (or head) of the displayed object.

The electromagnet may generate a magnetic field that applies a levitating force upward or vertically upon the magnetic element of the displayed object to cause the object to float. Animation is then imparted by injecting or introducing a modulation or oscillation to the levitating force such as by feeding an oscillation or drive signal to a driver of the electromagnet such as with a sine wave oscillator or generator. By tuning or pairing the introduced oscillation signal to a resonant frequency of wings on the displayed object, the body of the displayed object may be caused to shake or vibrate with a small amount of displacement (e.g., appear to be stationary to the human eye) while the attached wings flutter or flap at or near their resonant frequency with a much larger displacement. Other embodiments may include components to cause the levitating force to be oscillated at two or more oscillation frequencies to actuate or drive two or more driven/vibrated elements attached to the body that have differing resonant frequencies such as to cause a floating piano to have its keys vibrate to play a song or to convert vibratory energy of the object's components to a mechanical or other animating energy or function(s), e.g., to create a display output or animation function in addition to the vibratory movement.

More particularly, an apparatus is provided for creating a hovering/animation effect for a displayed object that is floated in the air. The apparatus includes a display structure or frame with an overhead housing and a base or stand. The apparatus also includes a magnetic levitation and oscillation assembly, which includes an electromagnet that is positioned or housed in the overhead housing over the base or stand. A levitated object with a body in which a magnetic element is embedded or provided (such as permanent magnet placed in a head of a bird or fairy figurine or the like) is positioned proximate to the electromagnet to be vertically supported or floated a distance above the base or stand of the display structure. The levitation and oscillation assembly includes a levitation driver or magnet actuator that drives the electromagnet with a control signal so as to generate a levitating magnetic field, and the assembly further includes an oscillating signal generator that oscillates the levitating magnetic field at an oscillating frequency. During such oscillation of the magnetic field, the body of the object is levitated by the electromagnet and is concurrently subjected to a first oscillating movement with a first displacement (such as a small vertical displacement of less than 0.5 inches such as less than about 0.1 inches). In response, a vibrated element attached to the object body has a second oscillating movement or vibration with a second displacement that is greater than the first displacement of the body (e.g., 2 to 5 times or more the vertical displacement of the body).

In some embodiments, the vibrated element (such as a wing or the like) includes an elongate body that is flexibly or pivotally attached via a mounting portion or component to the object body and that has a resonant frequency. In operation, the magnetic field may be modulated or oscillated such that the second oscillating movement has a frequency falling in a range of plus or minus 10 to 20 percent of the resonant frequency and in some cases substantially coinciding with such frequency (such as within about 2 to 5 percent of the resonant frequency). The displayed or levitated object may include an additional vibrated/driven element attached to the object body that has a third oscillating movement during the application of the oscillating magnetic field, and this third oscillating movement may be substantially similar to the second oscillating movement (e.g., similar in frequency and magnitude for example when the two driven or vibrated elements are right and left wings with elongate bodies of flexible material with similar or nearly identical resonant frequencies).

In other cases, one or more additional vibrated elements are provided on the body with each having a resonant frequency that may be the same or different from the first/original vibrated element such that the electromagnet may be controlled to have its magnetic field modulated or oscillated at differing oscillation/driving frequencies tuned to these resonant frequencies to selectively actuate the two or more vibrated elements independently or in combinations (e.g., by injecting one oscillation frequency at a time or injecting two or more concurrently). In some embodiments, the oscillating signal generator includes one or more sine wave oscillator that is fed to the levitation driver, and the levitation driver may also generate the control signal based on a reference signal/voltage and a feedback signal from a position sensor indicating a separation distance between the electromagnet and the magnetic element on the displayed object.

DETAILED DESCRIPTION OF THE PREFERRED EMBODIMENTS

Figure 1:
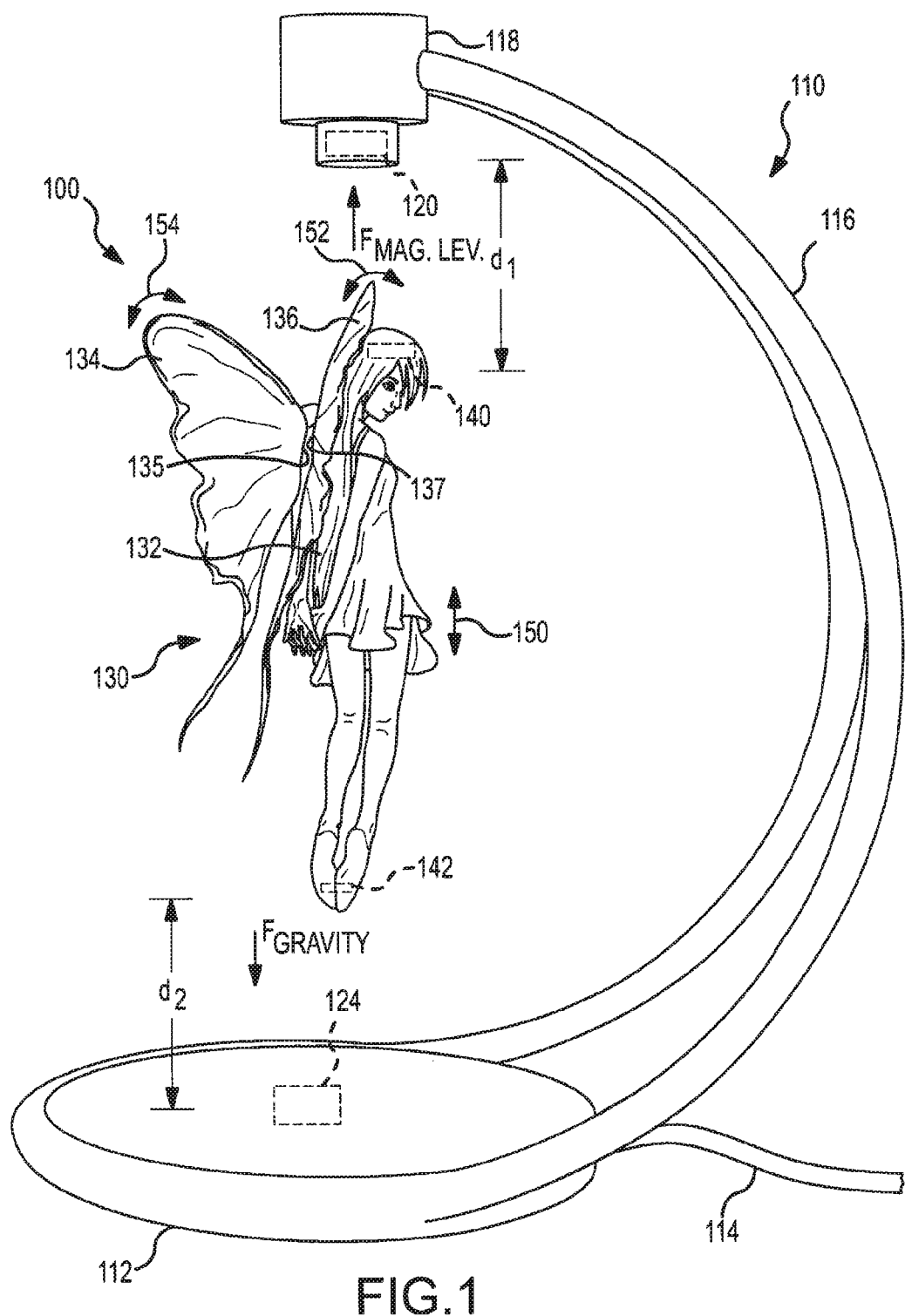
FIG. 1 illustrates a perspective view of a magnetic levitation assembly (or magnetic levitation novelty device) of an embodiment showing use of an oscillating or time-varying magnetic field to create a flying or hovering effect with a levitated, winged object.

Briefly, embodiments described herein are directed to magnetic levitation toys or novelty devices in which a magnetic field (or levitation forces) provided by an electromagnet are oscillated at one or more frequencies. These oscillation or drive frequencies are typically selected to correspond to resonant vibration frequencies of one or more driven or vibrated elements on a supported or magnetically levitated object. For example, the driven or vibrated elements may be wings extending from a body of a bird or fairy, with the wings mounted or configured for relatively large displacement at the drive or oscillation frequency of the levitating force/magnetic field while the body remains relatively stationary or has much smaller vibratory displacements so as to generate a hovering effect (e.g., the body has a small displacement oscillating movement or reciprocal vertical movement as it responds alternately to gravity and lifting magnetic forces at a frequency that drives the wings or other driven/vibrated components to have much larger oscillating movement).

The magnetic field or levitating force provided by the electromagnetic levitation and oscillation assembly provided in each novelty or toy may be varied using an oscillation signal generator or oscillation driver such as a sinusoidal signal generator feeding an oscillation signal to the levitation driver/actuator controlling the electromagnet or such as an unstable feedback loop for the levitation driver/actuator or via another oscillation means as described herein or as will become apparent to those skilled in the arts based on this description. The inventors understood that there is a continued interest in bringing new toy/novelty concepts to market and, particularly, ones that allow fairies, characters, and other objects to fly. Hence, a driving design force was to provide a device that could not only levitate a character or other object but also animate the character or object such as by causing wings to flap during levitation.

Prior novelties existed that used electromagnetic fields to levitate an object such as a globe. These devices typically use a support stand to provide an overhead electromagnet and an object with a permanent magnet or at least ferrous object embedded within it or on an outer surface is then positioned under the electromagnet. The electromagnet is powered or driven with a control signal that is maintained via a stable feedback loop to provide a suspending magnetic field or levitating force to float the object at a fixed distance and position relative to the electromagnet. The feedback loop may include a position sensor (such as a Hall effect sensor) to sense the distance between the levitated object and either the electromagnet itself or a separate magnet (e.g., a magnet placed at the bottom or base of the levitated object). Some other toys or novelty displays included mechanisms to rotate the levitated object about a vertical axis such as with auxiliary electromagnets mounted proximate to the object being spun. However, other than the spinning effect, none of the existing levitation devices provided any animation to the supported object via the magnetic field that was controlled to maintain the spacing between the levitating electromagnet and the magnetic element in the levitated object substantially constant or fixed.

In direct contrast, embodiments of magnetic levitation devices and systems intentionally modulate the magnetic field or levitating force in order to induce a vibratory animation of the floated or levitated object, and providing an oscillating levitating force or magnetic field causes the distance between the electromagnetic and the magnetic element in the object to be modulated at a driving frequency (or to intentionally vary over time) even if the change is relatively small (e.g., almost imperceptible to the viewer due to the much larger movement of the attached wings or other driven/vibrated elements).

The described concepts are especially suitable for use in magnetic lifting novelties that support or levitate objects under (or over) an electromagnet. The concepts or techniques provide the ability to controllably impart a substantial vibratory motion to portions of a suspended object, without substantially vibrating the remainder (or body) of the object. For instance, a doll or figurine such as a bird or fairy with a body and wings may be levitated by an electromagnetic system where that system produces an average lift sufficient to float or levitate the object above the ground or a base portion of a display assembly including an overhead (or underneath) electromagnet. The lifting or levitating magnetic field or force is modulated, however, such that it rapidly and controllably varies above and below the average value (e.g., within a range of plus or minus 20 percent of the average value or within a range of plus or minus 10 percent or less of the average value by varying the input or control signal by a like amount). In this case, the overall object or body may be caused to vibrate imperceptibly in the vertical direction, e.g., as the distance between the electromagnet and a magnetic element in or on its body is also varied over time with the levitating force.

However, portions or elements of the object such as the doll's, figurine's, or object's wings can be constructed so as to vibrate resonantly and with large excursions at this vertical "shake" frequency (e.g., relatively "large" displacements from a neutral position compared with the body such as up to 5 to 10 times or more movement of the driven/vibrated components when compared with the vertical displacement of the body with body displacement being measured as a change in the distance between the electromagnet and the body's magnetic element and displacement of the driven/vibrated element being measured at a midpoint, a tip, or another distal point relative to the mounting point to the body of the object). In practice, the driven elements such as wings may beat while the figurine or object body may only bob up and down slightly so as to provide a hovering effect as may be found in nature with a hummingbird or the like such that the overall effect provided is that of a live figurine or object flapping its wings to fly or hover naturally.

FIG. 1 illustrates an exemplary embodiment of a magnetic levitation toy or novelty apparatus 100. The assembly 100 includes a display frame or structure 110 that is used to house and position a magnetic levitation and oscillation assembly explained in more detail with reference to FIG. 2 (e.g., see assembly 230). The display structure 110 includes a base 112 that may be used to house a power source such as a battery or the like or, as shown, a power cord 114 may extend from the base for connecting the apparatus 100 to a wall socket or other power source. The display structure 110 also includes frame members/arms 116 that extend upward from the base 112 and support an overhead housing over the base 112. Power lines and other portions of the magnetic levitation and oscillation assembly may extend within the arms 116 from the base 112 to the overhead housing 118 to hide these connections from view and to protect them from wear and the like.

The apparatus 100 is adapted for levitating with oscillating movement an object 130 such as a fairy figurine/character or the like as shown. To this end, the apparatus 100 includes an electromagnet 120 supported within the overhead housing 118. The electromagnet 120 is operated using an unstable feedback loop or control signal that oscillates at one or more drive/oscillation frequencies to provide an oscillating magnetic levitation force (or time modulated magnetic field), $F_{maglev}$. The apparatus 100 may include a position sensor 124 in the base 112 to monitor a distance, $d_2$, between a magnet (or ferromagnetic material) element 142 in the levitated object. For example, a Hall effect sensor may be provided as sensor 124 and provide a feedback signal via a line in arm 116 to a controller or actuator of the electromagnet 120.

The object or figurine 130 includes a body 132 with a magnetic element (e.g., a permanent magnet or ferrous material component) 140 embedded in an upper portion (such as a head of character such as a fairy). The feedback signal from the sensor 124 is used to levitate the object 130 such that a magnet separation distance, $d_1$, between the electromagnet 120 and the magnetic element 140 is maintained relatively stable such as at an average distance over time or within a range about a desired or predefined separation distance. In other embodiments, the sensor 124 may be positioned in the overhead housing 118 to measure a distance, $d_1$, between the electromagnet 120 and the magnetic element 140. Significantly, though, the magnet separation distance, $d_1$, is not maintained constant, but, instead, the electromagnet 120 is operated so as to provide an oscillating levitation force, $F_{maglev}$, and this modulating levitation force or lifting magnetic field, $F_{maglev}$, causes the separation distance, $d_1$, to also vary a small amount at an oscillating or drive frequency.

As shown, during application of the modulated or oscillating levitation force, $F_{maglev}$ by the electromagnet 120, the body 132 of the object is subjected to a reciprocating or oscillating movement 150. Typically, the driving or oscillating frequency used to modulate the force, $F_{maglev}$, is rapid enough that the movement or bounce 150 of the body 132 is nearly imperceptible to a human observer and is chosen to match a resonant frequency of driven or vibrated elements 134, 136. In this manner, the magnitude of the movement 150 (or variance of distance, $d_1$) may be relatively small such as less than 0.25 inches and often less than about 0.1 inches but establish a vibrating body 132 that transmits the vibratory energy to the vibrated or driven elements 134, 136 that may have much larger displacements that are visible to the human observer.

In this specific example, a hovering effect is achieved during operation of the apparatus 100. The levitated object 130 includes a pair of vibrated elements or wings 134, 136 that extend outward from the body 132. The wings 134, 136 are attached with mounting portions 135, 137 that along with the bodies of wings 134, 136 are designed to allow the wings 134, 136 to have an oscillating movement shown at 152, 154 when the body 132 is subjected to oscillating movement 150. More specifically, the wings 134, 136 and their mounting portions 135, 137 are configured to have resonant frequencies (the same or differing resonant frequencies), and the electromagnet 120 is driven with a control signal that causes the levitating force, $F_{maglev}$, to be modulated over time or to vary at a frequency that approximates (e.g., within about 10 to 20 percent) or even substantially matches (e.g., within about 5 percent or less) of the resonant frequency (or frequencies) the wing assemblies 134/135 and 136/137.

Such shaking 150 of the body 132 causes oscillating or vibrating movement of the wings 134, 136 shown at 152, 154, and this movement 152, 154 may be large in comparison to the movement of the body 150 such as displacements of 5 to 10 times as much or more (e.g., as measured at the tips of the wings 134, 136 the displacement may be 0.3 to 0.5 inches, for example, while the body only moves 0.06 to 0.1 inches or the like). When the levitating force, $F_{maglev}$, is reduced below a tuned or set levitating average value, the body 132 drops 150 due to the force of gravity, $F_{gravity}$, and when the levitating force, $F_{maglev}$, is raised above this average levitating value, the body 132 moves upward vertically 150 toward the electromagnet 120, which provides the vibrating or shaking movement of the body 132 that is transmitted via mounting portions 135, 137 to the wings 134, 136 (e.g., the mounting portions may be springs, thin flexible members, and so on to provide a desired amount of flex or non-rigidity).

The drive frequency causes both the wings 134, 136 to flap or flutter, and, in some embodiments, the drive frequency may be chosen to cause the wings to move or flutter/vibrate at or near their resonant frequencies. Typically, the wings 134, 136 are designed to flap at the same resonant frequency, but some embodiments may call for the wings 134, 136 to have differing resonant frequencies and for the electromagnet 120 to be operated at differing drive/oscillation frequencies to concurrently or separately (in time) drive the wings 134, 136 (or other driven/vibrated elements). The wing bodies may be formed of a thin sheet of plastic or the like that is flexible such that a wave or other pattern is created in response to drive force input when the wing, which may be planar when at rest, is viewed along a side or edge. Embodiments of the present invention provide a hovering effect in which the movements 152, 154 are much larger than the vertical movement of the body 132 such that the wings 152, 154 appear to be moving independently or to have their fluttering motion decoupled from movement 150 of the figurine or toy body 132 so that the wings 134, 136 can flutter without appreciable motion and energy being coupled into the figurine itself (e.g., the toy body or figurine appears relatively stable and does not excessively shake or vibrate with wing motions).

FIG. 1 illustrates a magnetically levitated toy or novelty assembly 100 of one embodiment of the invention. As shown, the figurine or character 130 has a body 132 upon which a pair of wings 134, 136 is mounted or attached. In such toys or toy assemblies 100, wings 134, 136 are typically mounted on the back but may be mounted on other locations of the body 132, and the figurine 130 with wings 134, 136 is configured or designed to represent a fairy, a bird, an insect, or other creature or object that flies using moving or flapping wings. The wings 114 are typically made of a flexible and resilient material to allow them to be moved in a flapping motion as shown with arrows 152, 154 and also, in some embodiments, to flutter such that wave(s) move along the wing bodies (e.g., the wings 134, 136 are not rigid and do not in these embodiments remain in a fixed configuration such that their "at rest" shape differs at least periodically from the "in flight" shape(s)). For example, the wings 134, 136 may have bodies shaped similar to wings in nature and be formed as a unitary (or from multi-piece or hinged pieces) sheet of plastic or other flexible material such as cut sheet plastic less than about 0.125 inches thick and typically much thinner such as about 0.06 inches down to about 0.03 inches or less (with thickness and material being widely variable to practice the invention and varying with the size and shape of the wings and other design parameters). Alternatively, the wings 134, 136 may be substantially rigid, but flexibly hinged to the body such as by the use of miniature coiled springs (not shown). In this case, a wing resonant frequency and damping factor are easily set by the stiffness of the return spring, the mass and length of the wings, and their air-damping factor. The body portion 132 of the figurine 130 can be formed of paper, molded plastic, or other available material and decorated with clothes, paint, jewelry, and the like as desired, and the wings 134, 136 may also be decorated to achieve a desired look and/or effect.

Figure 2:
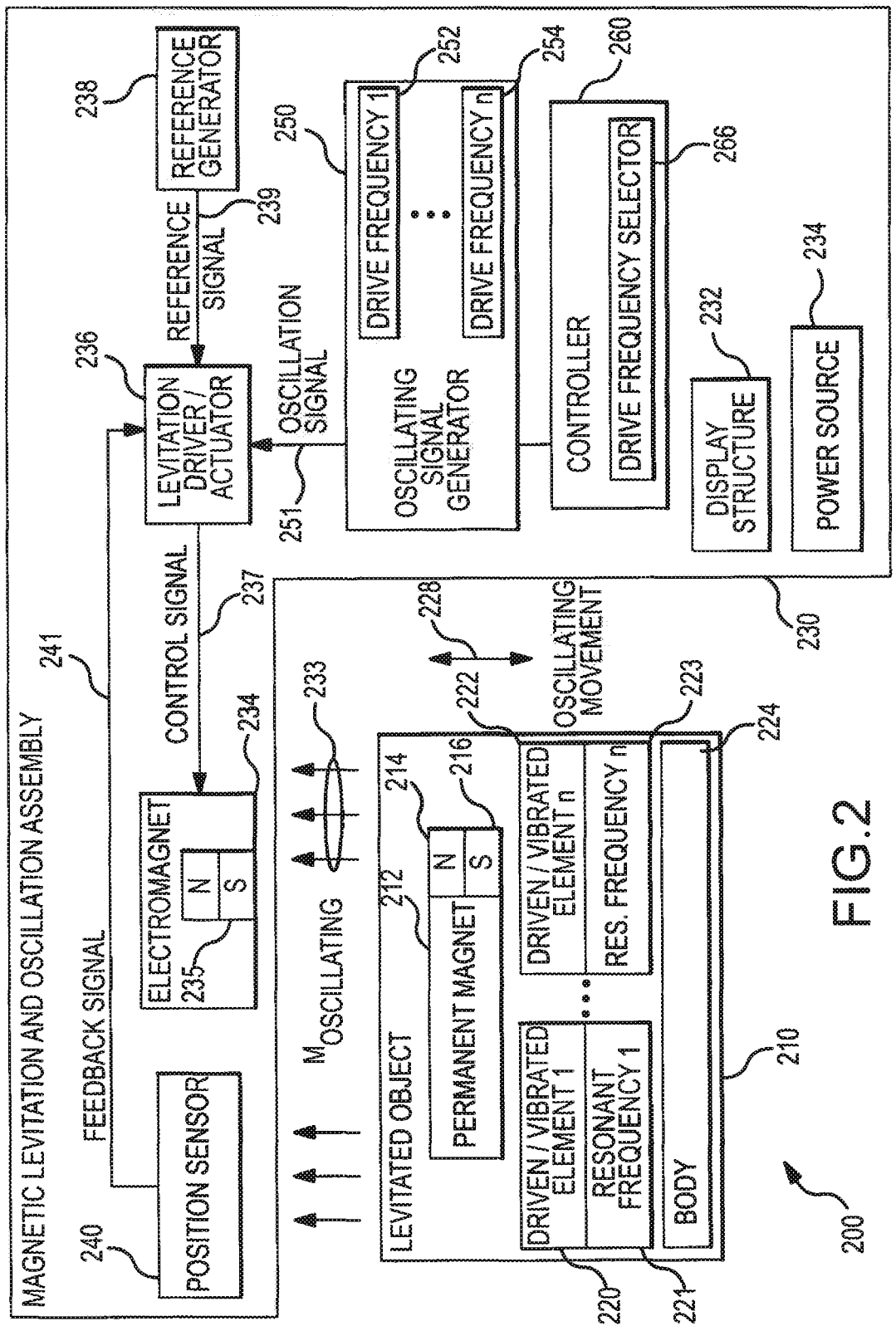
FIG. 2 is a functional block illustration of a magnetic levitation novelty device or system such as may be used to implement the assembly of FIG. 1 and other embodiments.

FIG. 2 illustrates a schematic or functional block diagram of an embodiment of a magnetic levitation apparatus or system 200, such as may be used to implement the apparatus 100 of FIG. 1 to provide a figurine or object with a hovering effect. The apparatus 200 includes a levitated object 210 and a magnetic levitation and oscillation assembly 230 that functions to levitate the object 210 with an oscillating or modulating magnetic field, $M_{oscillating}$. The application of the oscillating magnetic field shown at 233 causes the object 210 to have an oscillating movement 228, which in turn vibrates or excites driven/vibrated elements 220, 222 that are mounted on a body 224 so as to extend outward (or inward in some cases) and be allowed (at least in part) to move independently (or at least differently) from the movement of the body 224.

As shown, the levitated object 210 includes a body or support frame 224 that is used to support or receive a magnetic element 212 that may be a ferrous material component or a permanent magnet as shown with poles 214, 216. Typically, the magnetic element 212 is provided on or near a surface of the body 224 such as at one "end" of the body 224 that will be positioned proximate to the magnetic levitation and oscillation assembly 230 (e.g., adjacent an electromagnet 234). To animate the levitated object 210, one or more driven/vibrated elements 220, 222 are provided within the object 210 such as attached to the body 224 such that they are visible to an observer (e.g., wings or other external features, internal gears or the like when the body has clear/translucent walls, and so on) or that provide some function that creates a visible effect (e.g., a driven or vibrated element 220, 222 may vibrate such that it contacts other components to convert the vibratory energy or movements into mechanical or other energy). Each driven/vibrated element 220, 222 (e.g., 1, 2, 3, 4, or more elements) has an associated resonant frequency 221, 223 and/or at which it will vibrate or move significantly while the body 224 may only move a relatively small amount.

The resonant frequencies 221, 223 may be the same such as to cause each element 220, 222 to generally move in a similar manner (which may be desirable for a pair of wings and other applications) or the frequencies 221, 223 may include at least 2 resonant frequencies such that the corresponding elements 220, 220 may be driven differently and actuated separately such as when the drive/oscillating frequency of the oscillating magnetic field 233 corresponds to one of the frequencies (or concurrently actuated by concurrently using two or more drive frequencies to oscillate the field 233). This latter arrangement may be considered a multi-resonant frequency embodiment of the apparatus 200 that allows selective actuation of the elements 220, 222 by selecting or tuning the drive/oscillating frequency.

The magnetic levitation and oscillation assembly 230 includes a display structure 232 such as a stand for supporting the components of the assembly 230 and for creating a stage or display area for the object 210. A power source 234 such as a battery or a connection to an external power supply is provided in the assembly 230 and linked to (or at least partially embedded within) the display structure 232. An electromagnet 234 with a coil 235 is provided that is driven or actuated with a control signal or voltage signal 237 from a levitation driver/actuator 236. The driver 236, in turn, operates in part based upon a reference signal or reference voltage 239 input from a reference generator 238, which may be tunable or adjusted to set a "neutral" or start position or magnet separation distance between the electromagnet coil 235 and the permanent magnet 212. The levitation driver 236 further may adjust the signal 237 based upon a feedback signal 241 from a position sensor 240 that is used to monitor the spacing between the object 210 and a portion of the display structure 232. For example, the position sensor 240 may be a Hall effect sensor that provides a feedback signal 241 based on a distance between the position sensor 240 (which may be positioned proximate to the electromagnet 235 or a housing of the structure 232 holding the electromagnet 234) and the magnetic element 212 (or of a separate positioning magnet provided on/in the object 210).

In some embodiments, this loop provides a relatively stable feedback loop that maintains a substantially steady spacing between the object and the electromagnet 234 via the magnetic field 233. In other cases, though, the loop is configured to be an unstable feedback loop such that the magnetic field 233 is a modulated or oscillating magnetic field, e.g., one that is at or near one of the resonant frequencies 221, 223. In other words, the magnetic field 233 is oscillated by the driver 236 and creation of the control signal 237 to set up an oscillation 228 in the figure that is matched to the resonant frequency 221, 223 of at least one of the driven/vibrated elements 220, 222 so they flap or are actuated to have an oscillating movement on the body 224 (which may appear to have little or no vertical displacement). Providing an unstable feedback loop as the means for oscillating the magnetic field 233 may be somewhat complex when the assembly 230 uses a direct current (DC) magnetic field, because the creation of a DC-based field 233 may not require much in the way of electronics whereas an oscillating or pulse width modulation (PWM) field 233 may be more readily adapted to provide an unstable feedback loop to provide an oscillating magnetic field.

In other embodiments, as generally is shown in FIG. 2, the feedback loop provided by reference signal 241 and reference signal 239 is used by the levitation driver/actuator 236 to create a control signal 237 that, without more, would create a relatively stable operation of the electromagnet 234 such that magnetic field 233 would maintain a substantially constant distance or separation between electromagnet 234 and permanent magnet 212. However, to oscillate the field 233 and cause the oscillating movement 228, the assembly 230 includes an oscillating signal generator 250 to inject a sine wave or other signal 251 at a frequency to oscillate or pulse the field 233 (such as at 1 to 6 Hertz or some other drive/oscillation frequency). With this approach, the DC field 233 may be "detuned" such that the figurine or other object 210 has a tendency to oscillate 228 based on the interaction of gravity and the levitating field 233.

Tests performed by the inventors with such an apparatus 200 have worked reasonably well even using a fairy doll without specially designed wings 220, 222, and, during testing, the wings 220, 222 flapped rapidly while the fairy's body only bobbed or moved 228 slightly. In this tested embodiment, the electromagnet 234 was positioned overhead in the stand 232 while it will be understood that some embodiments may be fabricated in which the electromagnet 234 may be used to support a permanent magnet 214 in a lower or base of the body 224 of the object 210 although such embodiments may be somewhat more difficult to stabilize and control to keep the object within the display structure at a desired height above the electromagnet.

The oscillating signal generator 250 may be a sine wave generator or oscillator or the like that is tuned to provide an oscillation signal 251 with a particular frequency (such as one that oscillates the magnetic field 233 so as to create a movement 228 in body 224 that causes the element(s) 220, 222 to vibrate at or near their resonant frequencies 221, 223). In other cases, as shown, a controller 260 may be included that is operable via a drive frequency selector 266 (hardware and/or software component(s)) to cause the oscillating signal generator 250 to operate at differing drive frequencies 252, 254, which are matched to or correspond with resonant frequencies 221, 223 (e.g., are substantially the same or are selected to create an oscillating field 233 to create a vertical vibration 228 in body 224 to cause the elements 220, 222 to vibrate at or near their resonant frequencies 221, 223). In this manner, for example, the oscillating signal generator 250 may be used to inject a sine wave or other oscillating wave into an otherwise stable drive loop to introduce a pulsating effect in the reference signal 239 such that the control signal 237 causes the electromagnet 234 to output an oscillating magnetic field or levitating force 233 (e.g., to destabilize the feedback loop).

Figure 3:
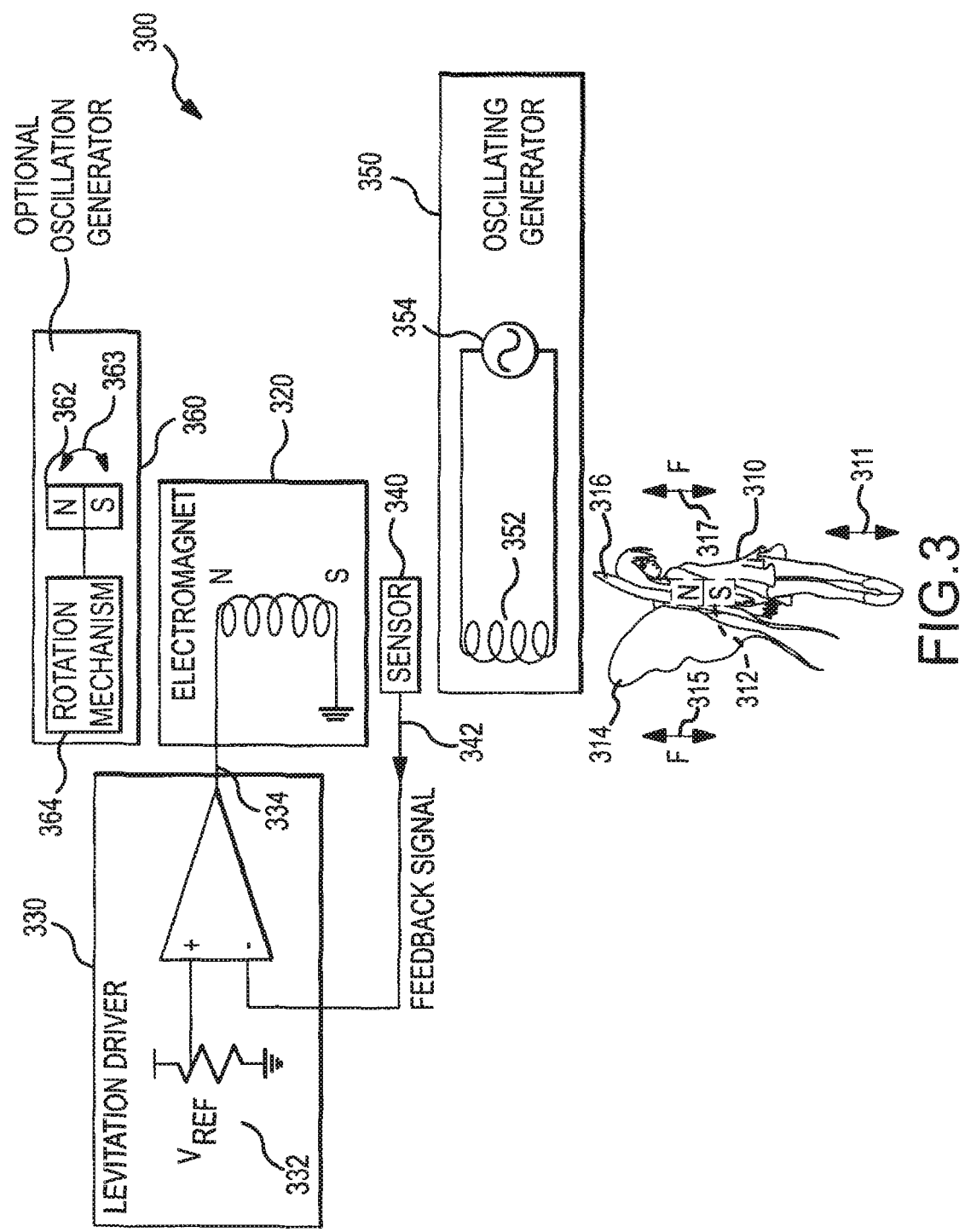
FIG. 3 is a schematic illustration of a magnetic levitation system of an embodiment showing additional techniques for providing an oscillating magnetic field or levitation force to create a hovering effect with a levitation or magnetically supported object such as a winged figurine.

FIG. 3 illustrates schematically another embodiment of a magnetic levitation apparatus 300 that may be used to implement a hovering effect with an oscillating magnetic field or levitating force such as in the device 100 of FIG. 1. As shown, the apparatus 300 includes an object with a body 310 that includes at least one magnetic element 312 such as a permanent magnet (e.g., rare earth magnet, an iron, nickel, or other metal, or other material that is in any of a number of shapes such as a disk/button magnet, a bar magnet, or the like). A number of driven or vibrated elements 314, 316 (such as two or more in many cases) are attached to the body such that they are able to be vibrated or caused to flex/move at a resonant frequency 315, 317 when the body 310 is shaken 311 with an oscillating magnetic field or levitating force. The resonant frequencies 315, 317 may be the same (or nearly so) or may differ such that these elements 314, 316 are separately actuated by an electromagnet 320 (or at least are displaced different amounts in response to oscillating movement 311 of body 310 in response to operation of the electromagnet 320).

As shown, the apparatus 300 includes an electromagnet 320 with a coil arranged with poles opposite of that of magnet 312 such that when the electromagnet 320 is powered its magnetic field attracts the body 310 toward the electromagnet 320 (e.g., floats or levitates the body 310 by counteracting/balancing forces of gravity upon the body 310). A levitation driver 330 is provided to produce a control or drive signal 334 in response to an input reference voltage signal/source 332 as well as a feedback signal 342 from a position sensor 340 (which acts such as with a Hall effect sensor to provide a signal indicative of a position of the magnet 312 relative to the sensor 340, which has a set position relative to the electromagnet 320).

Typically, the drive loop of the driver 330 and sensor 340 acts to produce a relatively stable magnetic field with the electromagnet 320 without inclusion of additional oscillation generation components/devices. To this end, the apparatus 300 may include an oscillation generator 350 that includes a coil 352 inserted between the electromagnet 320 and magnetic element 312 (which may be permanent magnet or be ferromagnetic material or the like to be attracted to the powered electromagnet 320) of the levitated object 310 or proximate to the field generated by the electromagnet 320 to inject changes or modulations to the field strength such that the body 310 is vibrated 311 vertically at a desired frequency due to a varying magnetic field or levitating force and constant gravity effects. A sine wave generator or other oscillator 354 may be used to introduce an oscillating field in the coil 352. The signal generator 354 typically will have its frequency adjusted to match the frequencies of resonance 315, 317 or to cause the vibration 311 of the body 310 to be such that the wings or other driven/vibrated elements 314, 316 have an oscillating movement at or near their resonant frequencies to create larger displacements. Typically, in such embodiments, resonant frequencies of vibratory movements 315, 317 would be the same or at least similar to move the elements 314, 316, but some embodiments may include more than one signal generator 354 to provide differing frequency oscillations by driving coil 352 or additional oscillating generators 350 may be provided.

In other cases, it may be useful to provide magnet-based oscillation generator 360 in place of generator 350 or in addition to generator 350. The oscillation generator 360 may include a permanent magnet 362 that is rotated at a drive or oscillating frequency by a rotation mechanism 364 as shown at 363 to oscillate the magnetic field generated by the electromagnet 320. In some cases, the generator 360 may be run selectively with the generator 350 to concurrently drive or vibrate 315, 317 the members/elements 314, 316 when these have differing resonant frequencies.

Some of the embodiments shown above have highlighted the use of an oscillating levitation force or levitating magnetic field to create a hovering effect or other effects in which two or more driven/vibrated members attached to a shaken/vibrated body are caused to vibrate larger amounts than the body (e.g., at or near their resonant frequency for example such as within 10 to 20 percent of such frequency). This may be used to cause wings to flap for example such that a magical way of causing a floating or levitating object to fly is provided as the magnetically levitated object is animated. In other embodiments, though, the taught concepts may be used to provide specific and individual movement to two or more different parts of a levitated or floating object. For instance, such independent actuation of vibrated elements may be provided by tuning the resonances of different parts or vibrated/driven elements of the object to specific frequencies, and then selectively applying oscillating signals such as sine wave modulations separately or in combinations of two or more to the magnetic field. In this manner, different portions of the object may be made to vibrate with large excursion independently or in selected combinations or subsets.

Figure 4:
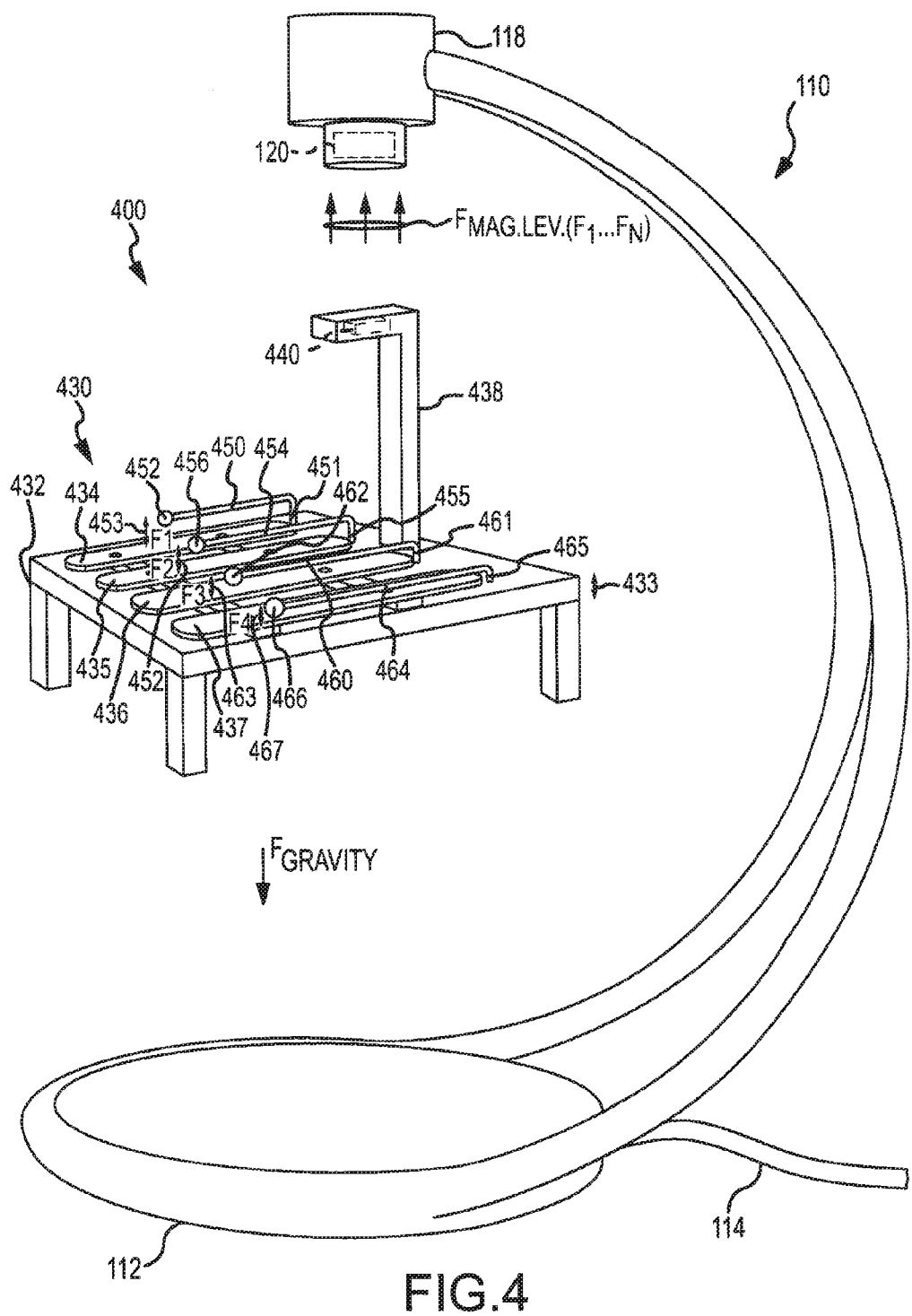
FIG. 4 is a perspective view of another embodiment of a magnetic levitation assembly similar to that shown in FIG. 1 but including a supported or levitated object having two or more components (here shown as xylophone mallets) that can be driven or actuated concurrently or separately such as to strike keys to play a tune via a selectable drive frequency of the oscillating magnetic levitation force.

FIG. 4 is an example of a magnetic levitation novelty device or toy 400 that is operable to provide a levitating force or lifting magnetic field that may be oscillated at two or more drive or oscillating frequencies to selectively actuate or animate two or more elements/members of a toy or object 430. Similar to the device 100 of FIG. 1, the device or toy 400 includes a base 112 attached to a power cord 114 and a support arm or frame 116 that supports an overhead housing 118 over the base 112. An electromagnet 120 is provided in this housing 118 and is operable such as by applying sine wave modulations or the like to provide a magnetic levitation force, $F_{maglev}$, at two or more driving or oscillating frequencies, which are selected to cause an object 430 (or its body 432) to vibrate or be displaced a relatively small amount at a particular frequency or reciprocating rate as shown at 433.

The object 430 in this example is a floating xylophone with a table or body 432 with a number of keys or bars 434, 435, 436, 437 that can be struck or played to play a musical note. Over each of these keys/bars is provided a vibrated or driven element in the form of a small mallet 450, 454, 460, 464 that are each attached to the upper surface of the body/table 432 with resonant mounting members 451, 455, 461, 465 such as thin wires, springs, or the like. A striking or mallet head 452, 456, 462, 466 contacts the adjacent/corresponding keys/bars 434, 435, 436, 437 when the mallets or vibrated members 450, 454, 460, 464 are vibrated or actuated at a particular frequency (or range of frequencies) such as at or near the resonant frequency of these members as shown with vertical movements 453, 457, 463, 467 while the table/body 432 is moved 433 (e.g., a smaller overall displacement typically).

An arm or hanger element 438 may extend upward from the table/body 432 and contain or house a magnetic element 440 upon which the levitating force, $F_{maglev}$, is applied in a modulated manner. In use the spring-loaded mallets over each of the bars can be played individually or in subsets of two or more so as to play a song (e.g., a pattern of oscillating signals may be stored in memory and then played by operating a controller to operate an oscillating signal generator or the like). With this use of magnetic levitation forces or fields at two or more oscillating or driving frequencies understood, numerous other toys or novelty devices in which driven or vibrated elements are operated separately or in combinations to create a desirable effect will be apparent to those skilled in the arts and are believed within the breadth of this description. For instance, a relatively broadband magnetically-coupled modulating signal containing a substantial portion of the audio frequency band may be applied to a levitating spherical structure with a broad passband to produce a substantially omni-directionally radiating loudspeaker.

Figure 5:
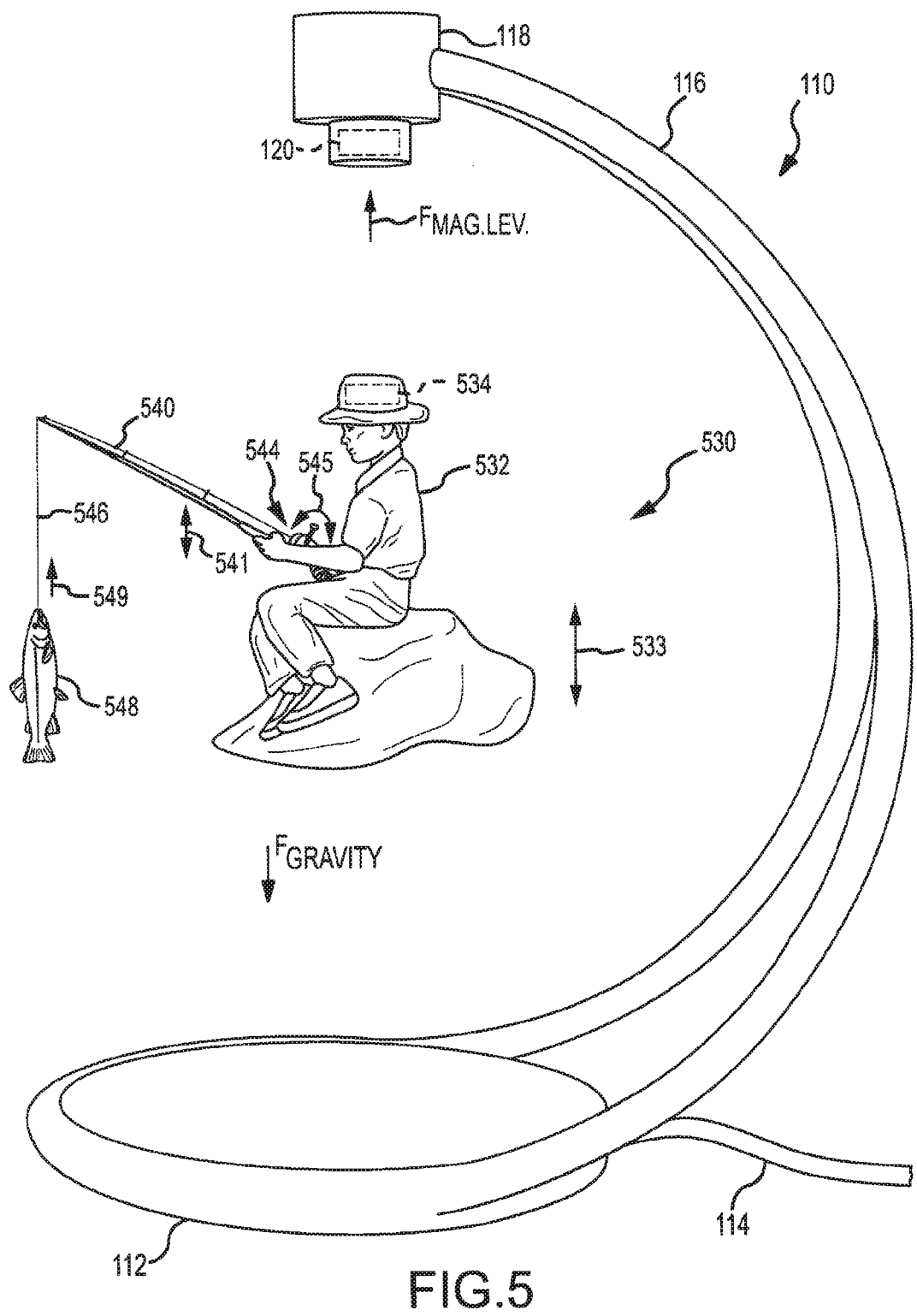
FIG. 5 is a perspective view similar to FIG. 4 showing an embodiment of a magnetic levitation assembly that is adapted to covert vibration within the vibrated or driven component into mechanical action (e.g., to drive a geared or ratcheted reel to reel in line and a hooked fish in this example).

In other embodiments, it may be useful or desirable to provide an object with components that can be driven with an oscillating magnetic field so as to convert vibrational motion of one or more elements into other motion. For example, a vibrating member may cause a wheel to turn and create a ratcheted mechanical motion of another component of the levitated object. For example, the toy or device 500 of FIG. 5 includes a magnetic levitation and oscillating assembly 110 with a base 112, a power cord 114, a support arm/frame 116, and overhead housing 118, and an electromagnet 120 creating an oscillating magnetic levitation force or magnetic field, $F_{maglev}$, that is driven at one or more oscillating or driving frequencies as discussed above.

The object 530 includes a body 532 with a magnetic element 534 embedded in an upper region or portion proximate to the electromagnet 120 and the body is vibrated as shown at 533 in response to the modulations of the levitating force, $F_{maglev}$, and gravity forces, $F_{gravity}$, acting on the body 532. The object 530 includes a vibrated or driven element 540 extending outward from the body 540, and this element 540 (e.g., a fishing pole/rod in this example of a fishing boy object) vibrates or has oscillating vertical movement 541 in response to the motion 533 of the body 532. Typically this motion 541 is much larger than the movement 533 such as when the levitating force, $F_{maglev}$, is tuned to oscillate or modulate so that the body vibrates to cause the rod or element 540 to vibrate at or near its resonant frequency. In response to such movement 541 of the rod/element 540, a reel component 544 that is adapted, such as with geared wheels and ratchet components, to convert vibratory energy into mechanical or rotational energy acts to rotate as shown at 545. In this example, this causes a line 546 to which a fish or other object 548 is tethered to be reeled in causing the fish 548 to move vertically upward as shown at 549. In this manner, the novelty device 500 displays a fishing boy that may be levitated and selectively operated by oscillating the magnetic field or levitating force, $F_{maglev}$, at a particular frequency tuned to cause vibration 541 of rod 540 to cause the boy to catch and reel in a fish. With such an example in mind, numerous other implementations of objects that may be levitated and selectively animated will come to mind to those skilled in the arts and are considered within the breadth of this description and the included claims.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the driven or vibrated elements such as wings may be attached or affixed to the body of the objects in numerous ways such as by flexible span members or by relatively spring-like members (which may include actual springs). In other cases, the span member may be replaced with a pivotal mounting adapted to set a particular resonant frequency for the element. Most configurations are designed to have the mounting or span member be adapted to return (such as with a spring force) the body of the element to an at rest or neutral position, e.g., a position at which the element remains when the body of the object is not being shaken or vibrated. Further, the terms "toy," "figurine," "body," "object," "wings," and "vibrated or driven elements" are used relatively broadly in this description and the following claim sets.

The oscillating or driving frequencies used to oscillate the magnetic field or levitating force created by the electromagnet may be tuned to a range of frequencies to suit the driven or vibrated elements and their resonant frequencies (or to a range of frequencies determined through testing or other methods to achieve a desired oscillating movement which may not require a perfect match to the resonant frequency of the element), which may vary with the weight and arrangement of the body as well its material, rigidity, and other characteristics of the body as well as the weight, material, size, shape, and other parameters associated with each element as well as the mounting element/spanning member used to attach the element to the body.

In the preceding description and figures, the wings of the objects are generally described as being flexible. However, in some implementations, wings may be mounted to the body with a separate spring, which can be well-characterized for return force. The use of a separate spring may be desirable as it allows precise setting of the resonant frequency based on this return spring's constant "k" and the length and mass of the wings. This concept may be thought of as providing a spring-loaded wing.

In other embodiments, the idea or feature of separating lift from modulation allows the creation of a floating, relatively broadband, loudspeaker. For instance, a device may be provided that functions to levitate a globe with a substantially "DC" field. Then, the device may include an assembly or devices to apply a substantially broadband modulating audio signal. With attention to the materials of the globe/object/toy and their construction, the resulting device provides an essentially "passive" loudspeaker (one where you essentially separate the drive coil from the diaphragm) that may be activated via the levitating field to provide a desired audio output. In the case of a globe, the loudspeaker would be levitated and provide a spherically-radiating loudspeaker.

The figures generally show a single magnet in the levitated object that is used for both levitation and modulation (excepting where we describe a second magnet used for the Hall Effect height adjustment). In some cases, though, a second (or more) separate magnet(s) may be added that allow more flexible modulation. For instance, the floating fairy (or other object) could have a magnet at the base, and this second (or more) magnet(s) could be "modulated" (up and down) by a rotating magnet in the base of the overall device, or alternatively, a magnet toward the center of the object could be moved sideways by a magnetic field set up by an electromagnet half-way up the stand.

We claim:

1. An apparatus animating a levitated object, comprising:
    a display structure comprising an overhead housing;
    a magnetic levitation and oscillation assembly comprising an electromagnet positioned in the overhead housing, a levitation driver driving the electromagnet with a control signal to generate a levitating magnetic field, and an oscillating signal generator oscillating the levitating magnetic field at an oscillating frequency; and
    an object comprising a body with a magnetic element positioned within the oscillating, levitating magnetic field, whereby the body is levitated by the electromagnet and is subjected to a first oscillating movement with a first displacement in a vertical direction, and wherein the levitated object further comprises a vibrated element attached to the body that is configured to have a second oscillating movement with a second displacement greater than the first displacement.

2. The apparatus of claim 1, wherein the vibrated element comprises an elongate body attached to the body of the object to have a resonant frequency and wherein the second oscillating movement has a frequency within a range of less than about 20 percent of the resonant frequency and greater than about 120 percent of the resonant frequency.

3. The apparatus of claim 2, wherein the frequency of the second oscillating movement of the vibrated element is substantially equal to the resonant frequency and wherein the second displacement is at least about double the first displacement.

4. The apparatus of claim 1, wherein the apparatus includes means for applying an audio input signal to the object and wherein the object includes a passive speaker element responsive to the audio input signal to generate an audio output.

5. The apparatus of claim 1, wherein the levitated object further comprises an additional vibrated element attached to the body of the object, wherein the additional vibrated element has a third oscillating movement substantially similar to the second oscillating movement with a third displacement proximate in magnitude to the second displacement.

6. The apparatus of claim 5, wherein the vibrated elements comprise right and left wings each comprising an elongate body formed of a flexible material and having a resonant frequency and wherein the oscillating frequency of the levitating magnetic field is selected based on the resonant frequency to cause the right and left wings to vibrate at a rate proximate to the resonant frequency.

7. The apparatus of claim 1, wherein the levitated object comprises an additional vibrated element, wherein the vibrated element and the additional vibrated element have differing resonant frequencies, and wherein the oscillating signal generator operates to inject differing oscillating frequencies to selectively drive the vibrated element and the additional vibrated element by imparting differing ones of the oscillating movements to the body of the object.

8. The apparatus of claim 1, wherein the oscillating signal generator comprises a sine wave oscillator providing an oscillation signal to the levitation driver.

9. The apparatus of claim 1, wherein magnetic levitation and oscillation assembly further comprises a reference signal generator and a position sensor outputting a feedback signal corresponding to a distance between the electromagnet and the magnet element, wherein the levitation driver generates the control signal based on an oscillation signal from the oscillating signal generator, the reference signal, and the feedback signal from a position sensor, and wherein when a control signal based on the reference signal and the feedback signal produces a levitating magnetic field maintaining a substantially constant separation distance between the electromagnet and the magnetic element.

10. A hovering effect display device, comprising:
    a figurine with a body comprising a magnetic element;
    an electromagnet generating a magnetic field, wherein the magnetic element is positioned proximate to the magnetic field whereby the body is levitated at a distance apart from the electromagnet;
    a magnetic drive assembly comprising a reference generator generating a reference signal, a position sensor generating a feedback signal based on the position of the body of the figurine relative to the electromagnet, and a magnet actuator driving the electromagnet with a control signal generated based on the reference signal and feedback signal;
    a wing assembly mounted to the body of the figurine, wherein the wing assembly comprises first and second wings each extending outward from an exterior surface of the body; and means for modulating the magnetic field at an oscillating frequency corresponding to a resonant frequency of the first and second wings.

11. The device of claim 10, wherein the modulating means comprises a sine wave oscillator providing an oscillation signal to the magnet actuator and wherein the control signal is further generated based on the oscillation signal.

12. The device of claim 10, wherein the modulating means comprises a permanent magnet positioned proximate to the electromagnet and a rotation mechanism rotating the permanent magnet at the oscillating frequency.

13. The device of claim 10, wherein the body of the figurine has a first oscillation movement with a first magnitude and wherein the first and second wings each have a second oscillation movement with a second magnitude that is greater than the first magnitude.

14. The device of claim 13, wherein the second oscillation movement has a frequency within about 20 percent of the resonant frequency.

15. The device of claim 10, wherein the distance between the body and the electromagnet varies less than about 0.5 inches during the levitation using the oscillating magnetic field on the magnetic element.

16. A magnetic levitation assembly, comprising:
a body including a magnetic element;
at least two elements extending from the body that are adapted for oscillating movement relative to a mounting to the body; and
a magnetic levitation and oscillation assembly generating a magnetic field that is modulated at an oscillation frequency, wherein the body is positioned with the magnetic element interacting with the modulated magnetic field and wherein at least one of the elements is vibrated to have an oscillating movement greater than a vertical movement of the body.

17. The assembly of claim 16, wherein the elements have a resonant frequency substantially equivalent to the oscillation frequency.

18. The assembly of claim 16, wherein the elements have differing resonant frequencies and the oscillation frequency is varied over time to correspond to each of the resonant frequencies, whereby each of the elements is actuated to have an oscillating movement greater than the vertical movement of the body.

19. The assembly of claim 16, wherein the magnetic levitation and oscillation assembly includes an electromagnet driven by a levitation driver based on a feedback signal from a position sensor indicating a separation between the magnetic element and the electromagnet and on an oscillation signal from an oscillating signal generator that defines the oscillation frequency.

20. The assembly of claim 16, further comprising means for responding to the oscillating movement of the at least one vibrated element to generate a display output.

* * * * *